United States Patent
Brown et al.

(10) Patent No.: US 7,045,067 B2
(45) Date of Patent: May 16, 2006

(54) METHOD AND APPARATUS FOR INCREASING FILTER CONTAMINANT LOADING CAPACITY

(75) Inventors: Craig J. Brown, Pickering (CA); Michael A. Sheedy, Uxbridge (CA)

(73) Assignee: Eco-Tec Limited, Pickering (CA)

( * ) Notice: Subject to any disclaimer, the term of this patent is extended or adjusted under 35 U.S.C. 154(b) by 28 days.

(21) Appl. No.: 10/911,618

(22) Filed: Aug. 5, 2004

(65) Prior Publication Data

US 2006/0027511 A1 Feb. 9, 2006

(51) Int. Cl.
*B01D 24/46* (2006.01)

(52) U.S. Cl. ............... 210/793; 210/795; 210/275; 210/279; 210/290

(58) Field of Classification Search ............... 210/791, 210/792, 793, 794, 795, 797, 798, 269, 275, 210/279, 290, 409, 411, 412
See application file for complete search history.

(56) References Cited

U.S. PATENT DOCUMENTS

| 293,745 | A | * | 2/1884 | Hyatt ..................... 210/290 |
| 3,817,378 | A | | 6/1974 | Ross |
| 3,876,546 | A | * | 4/1975 | Hsiung et al. ............. 210/275 |
| 4,166,037 | A | * | 8/1979 | Montagnon ............... 210/275 |
| 4,668,405 | A | * | 5/1987 | Boze ....................... 210/795 |
| 4,693,831 | A | | 9/1987 | Garzonetti |
| 2004/0020870 | A1 | | 2/2004 | Amburgey, Jr. |

* cited by examiner

*Primary Examiner*—Robert James Popovics
(74) *Attorney, Agent, or Firm*—Bereskin & Parr

(57) ABSTRACT

The filter contaminant loading capacity of a depth granular media filter is increased by imposing a so-called "back-slip" on the filter bed. At intervals between normal backwashing, a volume of liquid is passed upwardly through the media bed under flow conditions selected to displace at least some of the contaminants upwardly in the bed while essentially removing none of the contaminants from the filter vessel. Preferably, the filter bed comprises at least two media types of different but uniform particle sizes and densities, the media types each forming a distinct layer in which the effective particle size of the media in each successive layer decreases in a downward direction in the vessel.

6 Claims, 2 Drawing Sheets

METHOD AND APPARATUS FOR INCREASING FILTER CONTAMINANT LOADING CAPACITY

FIELD OF THE INVENTION

This invention relates generally to so-called depth granular media filters such as sand filters.

BACKGROUND OF THE INVENTION

Filters of this type have long been used to purify liquids such as water and wastewater of contaminants. The contaminants removed by these filters are undissolved and may be solids or immiscible liquids such as oil. For simplicity, the term 'solids' will be used herein and is intended to include immiscible liquid contaminants and solid contaminants. The simplest configuration consists of a single layer or bed of granular media such as silica sand, 30–100 cm in depth, contained within a containment means or vessel. The liquid to be filtered flows downward through the media bed under the influence of gravity or applied pressure.

As the service cycle proceeds, solids accumulate on the surface and within the media bed, in the interstices of the media particles. Solids are driven further into the media bed over time and eventually, they break through the media bed into the filtrate. At the same time, the flow resistance of the bed increases and the flow may become too slow and/or the pressure drop may become too high. The media must be cleaned or replaced when this occurs The simplest way to clean the media is by a process called 'backwashing'.

During backwash, liquid, typically either feed or preferably filtrate, is passed up through the bed, expanding and fluidizing the filter media. Normally the overall depth of the media bed is expanded by 25–100% of its freely settled depth in this manner, thereby allowing the accumulated solids to be flushed from the filter. The effluent from the top of the vessel, containing the solid contaminants, is diverted to waste. At a minimum, the volume of backwash liquid must be greater than the void volume of the filter vessel. This void volume is equal to the volume of liquid above the media in addition to the interstitial volume of liquid in the filter media bed which is typically about 40% of the superficial media volume. Normally 2–5 void volumes of backwash water are required for an effective backwash to remove the majority of the solids. For a filter with 36 inches (91 cm) of media and 36 inches of freeboard, the void volume would be about 31.5 gallons per square foot (1.28 $m^3/m^2$) of filter area. Upon termination of the backwash flow, the media is allowed to settle by gravity before the filter is returned to service. The effectiveness of the backwash can be enhanced by simultaneously admitting air into the bed, providing provisions are made to avoid loss of filter media due to the increase in turbulence that this so-called 'air scouring' provides.

The liquid velocity for the backwash that is chosen, is dependent on the size and density of the media particles, but is typically about 15–25 gallons per minute per square foot of filter area (gpm/$ft^2$) (37–61 m/h). A filter with 36 inches (91 cm) of media and a 36" (91 cm) freeboard that is backwashed with 5 void volumes at 20 gpm/$ft^2$ (48.9 m/h) would take approximately 8 minutes to backwash.

After backwash, the cleaned filter media particles re-settle by gravity to the bottom of the vessel. The largest diameter media particles, with the fastest terminal settling velocity, settle towards the bottom of the media bed, while the finest particles, with the slowest terminal settling velocity, settle towards to the top of the bed (assuming that all the particles have the same density). As a result, when the filter is placed in service once again, the feed liquid will see the finest media particles first, followed by progressively coarser media particles. This phenomenon is the opposite of what would be considered optimal, since most of the contaminant particles tend to filter on the top of the bed and not penetrate deeply into the bed.

The filter performance is dependent on a number of different parameters as far as its design and operation are concerned. The total suspended solids concentration [TSS] of the filtrate, for example is strongly influenced by the service liquid velocity and the particle diameter of the filtration media.

Higher service liquid velocities (i.e. service flow rates) tend to drive the solids further into the media bed. This results in utilization of a greater proportion of the media bed for solids retention, thereby increasing the solids loading capacity of the filter. On the other hand, a higher service liquid velocity generally causes increased leakage of solids into the filtrate. Liquid velocities of depth media filters are usually less than 8 gpm/$ft^2$ (20 m/h) and typically about 4 gpm/$ft^2$ (10 m/h).

By employing a finer media (i.e. smaller media particles) it is possible to reduce the [TSS] of the filtrate. The disadvantage of reducing the media particle size is that a larger proportion of the solids will be filtered on the top surface of the filter media bed instead of penetrating deeper into the media bed. As a result, pressure drop across the filter increases very quickly or the flow drops very rapidly. This results in prohibitively short filter runs between backwashes. The use of coarser media allows the solids to penetrate deeply into the filter media bed, thereby maximizing the solids loading capacity of the filter. The disadvantage of using coarse media is that the solids removal efficiency is inferior to fine media beds. The ideal filter design would have the coarsest filter media at the top of the filter bed with the media gradually decreasing in particle diameter with depth. In theory, this provides the high filtration efficiency of a fine media bed, along with the high solids loading capacity of a coarse media bed.

This objective can be approximated by using two or more media layers of differing specific gravity. For example, a so-called 'dual media filter', widely used in water treatment, contains approximately 30 inches (75 cm) of crushed anthracite (density=1.5, effective particle size=1 mm) over 6 inches (15 cm) of silica sand (density 2.7, effective size=0.35 mm). This concept has been extended in so-called 'multi-media filters' to employ as many as five different layers of media of decreasing effective size and increasing density.

Under conditions of optimal coagulation and system operation, dual and multi-media filters provide reasonably good performance. Even under optimal conditions however, such filters typically undergo a ripening period when they are first put into service after a backwash. During this period, water quality is inferior and must be discarded. Moreover, while the filtrate quality tends to initially improve as the cycle proceeds, termination of the cycle is usually necessitated by a [TSS] breakthrough (as evidenced by a turbidity increase). Sometimes, but not always, this [TSS] breakthrough is accompanied by an appreciably increased pressure drop and/or flow reduction.

Depth media filters are limited in their solids loading capacity. As the [TSS] of the feed water increases, the duration of the service cycle decreases. The proportion of the filtered water used for backwash and the quantity discarded due to filter ripening becomes an appreciable portion of the total production. Furthermore, the amount of time devoted to backwashing also becomes more significant as [TSS] increases. Eventually, feed [TSS] reaches a point where it is no longer feasible to use a filter of this type. Normally, feed [TSS] of about 50 ppm are considered the practical maximums. Although the solids loading capacity varies quite widely depending upon the nature and concentration of the feed [TSS] as well as the filter design and operating conditions, a good rule of thumb is about 1 pound of solids per square foot of filter media cross-sectional area or about 5 kg/m².

As discussed above, single layer sand filters tend to accumulate a layer of solids on the top surface of the media bed. Once this layer is formed, most of the filtration occurs in this layer and not throughout the depth of the media bed. As a result, the service cycle may be relatively short. The solids accumulated in this top layer tend to become compressed together forming a crust over the duration of the filter service run. When the filter is backwashed, the crust breaks up, and forms large agglomerated fragments, that are much larger in size than the original particles being filtered. In some cases, these fragments are so large and dense that they cannot be removed from the filter during backwash. These fragments are sometimes referred to as 'mud-balls'. Mudballs can accumulate in the filter media bed and eventually interfere with filtration operation and efficiency.

Various inventions have been devised to increase the solids loading capacity of depth media filters. U.S. Pat. Nos. 3,817,378 and 4,693,831 describe a single layer, gravity flow sand filter currently manufactured by US Filter under the trade mark HYDRO-CLEAR. In this filter, a pocket of air is introduced into the bottom underdrain system at sub-fluidization velocity to pulse the media bed between backwashings. According to these patents, "the pulsed fluid dislodges solids from the upper surface of the filter bed and folds a portion of them into the bed itself". The manufacturer claims that this increases filter run length up to four times, greatly reducing the number of backwashes per day. An important feature of this filter is that solids are dislodged from the upper surface of the media bed, although no liquid is actually passed upwardly through the filter media bed during the so-called "back-pulse".

The present invention aims to provide an improved method for of increasing the solids loading capacity of a depth media filter. This has the effect of increasing the amount of feed that can be treated between backwashes in a similar manner to the Hydro-Clear filter, however there are a number of significant and important differences which will become apparent.

SUMMARY OF THE INVENTION

According to the invention, there is provided a method of operating a depth granular media filter comprising a filter vessel containing a bed of filter media, the method comprising the steps of:

(a) passing a feed liquid downwardly through the bed during normal down-flow service of the filter for removing contaminants from the liquid by loading the contaminants onto the filter media;

(b) periodically backwashing the media to remove contaminants from the filter media and displace the removed contaminants from the vessel; and, (c) at intervals between steps (a) and (b) passing upwardly through the bed a volume of liquid under flow conditions selected to displace at least some of the contaminants upwardly in the bed while essentially removing none of the contaminants from the vessel.

In general, the flow conditions should be selected so that the flow velocity is high enough to significantly expand the lower media layer (e.g. by at least 25%) but not so high that the media is displaced out the top of the filter vessel, the volume should be greater than one lower-media void volume in order to displace the contaminants, but less than one filter void volume, and the duration should be less than 60 seconds to avoid expansion of the upper media layer so that the solids are retained therein.

The media bed preferably utilizes two, or possibly more layers of media of decreasing effective size and increasing density. Solids are loaded into the filter media bed during a service cycle wherein the liquid being filtered is passed down through the media bed. Because the filter is operated at relatively high service flows and relatively coarse media particles are employed in the top media layer, the solids contained in the feed liquid tend to penetrate deeply into the media bed with very little accumulation on the top surface.

As discussed above, the advantage of the coarse media is that it has a relatively large solids loading capacity. The disadvantage is that a small, but significant quantity of solids pass through unfiltered. In order to catch the solids that pass through the top, coarse layer of media, one or more layers of fine media are placed underneath. The fine layers will remove the remaining solids more effectively, but will quickly become loaded as their solids holding capacity is much less. Under these conditions, the service cycle is usually terminated when the pressure drop increases and/or the flow rate decreases to unacceptable levels, rather than when [TSS] breaks through. A large proportion of the increase in pressure drop may be due to accumulation of solids in the upper portion of the fine layer of media. There may still be a significant portion of solids holding capacity remaining in the top, coarse layer, despite the high total pressure drop across the filter. According to prior art, the filter would then be backwashed as described above in order to remove solids from the media bed and flush them from the filter vessel.

According to the present invention, when the flow resistance in the filter has increased due to the accumulation of solids, a so-called 'back-slip' is applied to the filter in lieu of a conventional backwash. The term 'back-slip' is used herein in order to distinguish it from the standard term 'backwash' as well as the term 'back-pulse' which has been employed in more recent prior art processes, such as the Hydro-Clear filter, where air is used in a similar, but significantly different process.

During back-slip, liquid is passed up through the filter media bed in such a manner that the top, coarse media layer is not expanded to any appreciable extent, while the lower, finer layer(s) is expanded in the usual way (ie. greater than about 25%). Under these conditions, solids that have accumulated in the lower layer(s) are removed from this media and are passed up into the upper, unexpanded layer. Since some degree of agglomeration of the fine solids has occurred in the lower media, they are readily filtered and retained in the upper, unexpanded layer during this step. Since the upper layer is not expanded, significant quantities of solids are not dislodged from the upper media layer during the back-slip.

Since the objective is not to remove the solids from the filter vessel during the back-slip, a relatively small volume of liquid is required-much less than 1 filter void volume. The primary objective is to remove the solids accumulated in the lower media layer only. Therefore, the volume of liquid required for the back-slip can be as little as the void volume of the lower media layer. For a lower media layer that is 8 inches (20.3 cm) in depth and containing 40% porosity, the minimum volume would be only about 2 gallons per square foot (0.7 l/m$^2$) of filter area. At a flow velocity of 12 gpm/ft$^2$ (29.3 m/h) this would take only about 10 seconds. To ensure that an appreciable proportion of the solids contained in the lower, expanded layer is removed, it would be necessary to pass somewhat more than this minimum amount, but still appreciably less than the entire void volume of the filter.

An important aspect of the invention is that the upper, coarse media layer is not expanded during the back-slip. As a result, no significant quantities of solids are removed from this layer. If the upper, coarse layer were allowed to expand, appreciable quantities of solids would be dislodged from the media and they would pass into the freeboard. If they are not flushed from the filter vessel, they would immediately deposit on the top of the filter bed when the filter is returned to service. This would have two deleterious effects: First of all, because the solids would have been previously agglomerated on the media, they would not penetrate deeply into the bed and would tend to form a continuous layer of low permeability on top of the media bed similar to the 'crust' described above, that occurs with single layer filters of the prior art. This would cause high initial pressure drop and reduce the length of time before the filter must be taken out of service again. Under these conditions, the initial pressure drop could actually be higher than the pressure drop across the filter before the back-slip. The other deleterious effect is that this layer of solids would become compressed during service and could lead to the formation of mud-balls, as described above.

Expansion of the media during up-flow conditions is primarily dependent on the media particle diameter and density and the upward liquid velocity. The minimum upward liquid velocity at which fluidization (i.e. expansion) of the media occurs increases with increasing particle diameter and density and is very similar to the terminal settling velocity as defined by Stokes law. Accordingly, the media with the lowest terminal settling velocity will form the top layer and the media with the larger terminal settling velocity will reside below. One would therefore reasonably expect the top layer to expand during up-flow before the bottom layer. This is directly opposite to the effect that is required to practise this invention.

The inventors have found surprisingly, that under some conditions and for a short period of time, with a particular multi-layer media configuration, that the lower, finer layer(s) of media may be expanded by more than 25% while the top, coarse layer does not expand to any significant extent. During this time, the top layer will move up the filter vessel in an unexpanded state, as a plug, ahead of the finer, lower, expanded layer(s). If the upward liquid flow is continued at a constant rate for an extended period of time, eventually the top layer will break-up and become fluidized. According to the present invention, the duration of the back-slip time duration is therefore limited so that break-up and fluidization of the top layer does not occur.

This delay in fluidization does not occur when the coarse media is placed in the filter vessel by itself and otherwise subjected to the same up-flow conditions. Full fluidization of the coarse media occurs in less than 20 seconds under these conditions. Although the inventors do not wish to be bound by theory, apparently it is the interaction of the coarse media particles with the fine media particles that causes the described "plug flow" phenomenon to occur. There is a region near the interface of the two media layers where some media intermixing occurs, the small media particles filling in the spaces between the coarse media particles. This region of low porosity and permeability seems to act as a kind of piston, pushing up the top media layer as a plug and inhibiting its fluidization and expansion.

This delayed fluidization of the upper layer does not occur in all multi-media filters, however. For example, in a conventional dual-media filter of the prior art with a layer of anthracite (1 mm particle diameter) placed over a layer of silica sand (0.35 mm particle diameter), appreciable expansion of the coarse layer will occur within 20 seconds. In a preferred embodiment of the invention that utilizes 0.69 mm anthracite over 0.09 mm zircon, no expansion of the coarse layer occurs during the initial 20 seconds and may not occur for as long as 60 seconds. In the preferred embodiment, the effective size of the fine media is less than 25% of the effective size of the coarse media.

After the back-slip has been carried out, the filter may be returned to service. According to this invention, an appreciable reduction in filter bed flow resistance will be noticed as a result of implementation of the back-slip. If the filter is operated under constant flow conditions, this will manifest itself in a reduced pressure drop. If the filter is operated under constant pressure conditions, this will manifest itself in an increased service flow. If no control is applied, both reduced pressure drop and increased flow will be observed.

The filter may remain in service for some time before the flow resistance of the filter again increases (ie. reduced flow and/or increased pressure) to an unacceptable limit. At this point, the back-slip process may be repeated again before returning the filter to service. This can be repeated several times; however a general reduction in the time between successive back-slips will be noted. This occurs as the voids within the upper media layer fill with solids to a greater extent with each service loading and back-slip. Eventually, the effectiveness of the back-slip will be minimal. At this point the filter must be removed from service and back-washed in the usual manner to remove the accumulated solids from the filter. It has been found that the solids loading capacity of the filter can be increased by a several-times-factor by practice of the back-slip process of this invention.

When the filter is placed back into service after a back-slip, a brief ripening period will be noted during which time the turbidity of the filtrate will be rather high. During this period it may be necessary to divert the filtrate. This is similar to what normally occurs after a filter backwash and is well known to those skilled in the art. In fact, the ripening period of conventional media filters can represent a significant proportion of the service cycle and wastewater generated by the filter. This is an important issue. For example, U.S. patent application 2004/0020870A1 discloses an invention specifically intended to reduce the concentration of contaminants during 'ripening' of prior art filters. This is particularly an issue when treating high [TSS] feed-water, where the volume of filtrate produced between backwashings is rather small. Under such conditions an appreciable fraction of the filtrate must be discarded because of ripening.

It has been found that the use of a fine media layer whose article size is less than 25% of the diameter of the coarse layer, has additional advantages. Specifically, it appreciably reduces the ripening time and volume of filtrate that must be diverted to waste. Consequently, the amount of additional filtrate produced after a back-slip that is acceptable before necessitating a backwash can be rather small. In other words, because of the short ripening period afforded by using finer media, more back-slips can be performed before a backwash is necessary, thereby increasing the solids loading capacity of the filter and reducing the amount of time the filter is out of service.

BRIEF DESCRIPTION OF THE DRAWINGS

In order that the invention may be more clearly understood, reference will now be made to the accompanying drawings which illustrate a particular preferred embodiment of the invention, and in which:

FIGS. 2 and 3 are schematic vertical sectional views through the filters in which FIG. 2 illustrates normal downflow service of the filter and FIG. 3 illustrates back-slip.

DETAILED DESCRIPTION OF THE INVENTION

EXAMPLE

A dual media filter of a preferred embodiment of the invention was assembled for testing with the following specifications:

Vessel diameter: 16 inches (40.6 cm)
Vessel height: 96 inches (244 cm)
Top media material: anthracite
Top media density: 1.5 g/cm$^3$
Top media effective size: 0.69 mm
Top media unexpanded/free settled height: 36 inches (91 cm)
Bottom media material: zircon sand
Bottom media density: 4.6 g/cm$^3$
Bottom media effective size: 0.09 mm (the ratio of fine to coarse particle size=0.13)
Bottom media unexpanded/free settled height (above bottom strainers): 8 inches (20 cm)

Figure 2:
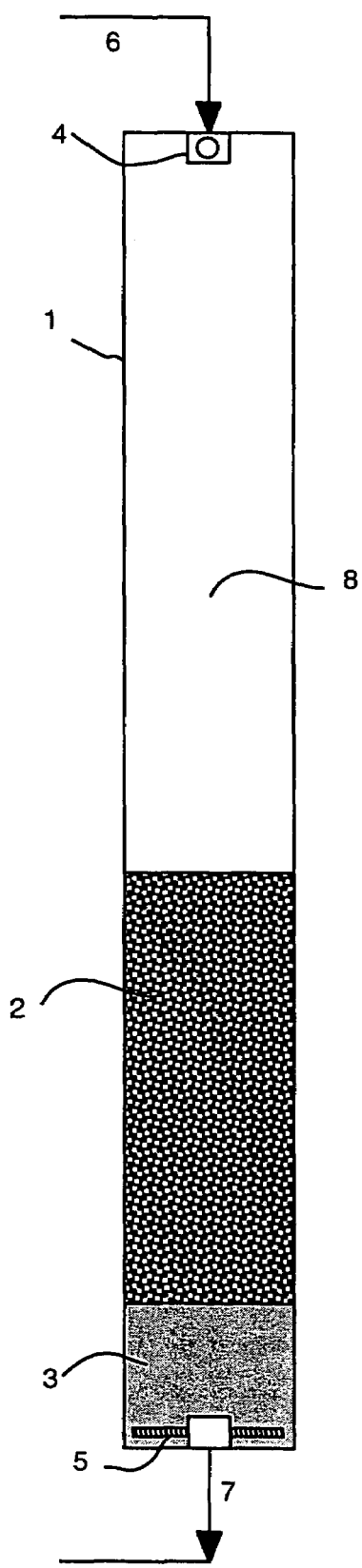

The filter is shown in FIG. 2 and includes a pressure vessel (i.e. the filter vessel) 1 containing two layers of filter media, consisting of an upper, coarse media layer 2 and a lower, fine media layer 3. Liquid to be treated 6 is admitted to the top of the filter vessel 1. A fluid distributor 4 is used to dissipate the inlet liquid velocity and/or distribute the liquid over the cross section of the vessel. The fluid to be treated passes down through the filter vessel, first through the freeboard area above the filter media 8 and then through the coarse media layer 2 and then the fine layer 3. The media is retained inside the vessel utilizing means such as strainers 5. Filtered water 7 is collected from the bottom of the filter vessel.

Figure 3:
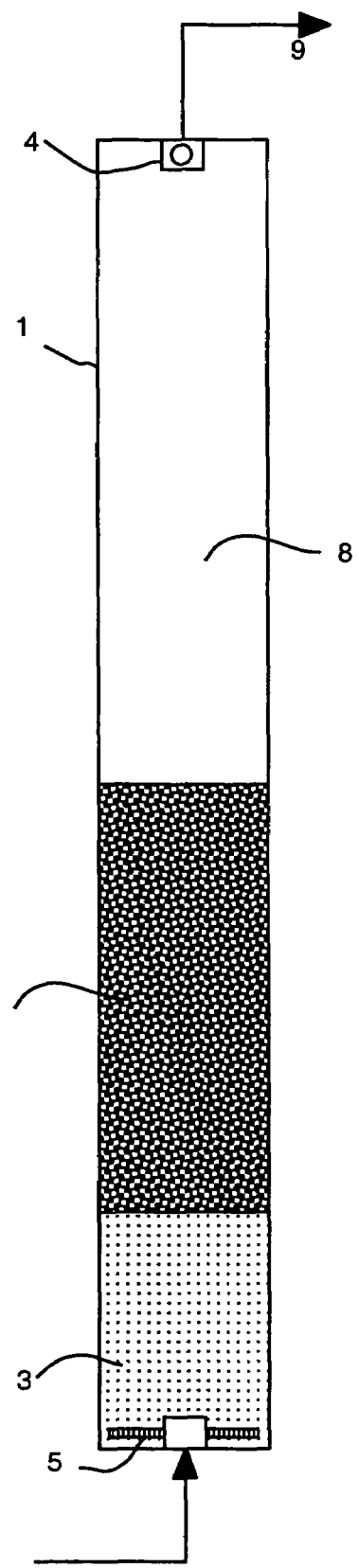

During the back-slip (FIG. 3), filtrate is admitted to the bottom of the filter vessel 1 and passed up through the vessel, first through the fine media layer 3 and then through the coarse media layer 2. During the back-slip step, the lower, fine media layer 3 is expanded. The top, coarse layer moves up the vessel ahead of the fine media layer, but is not expanded to any significant extent. A small quantity of liquid is collected from the top of vessel 1.

In the example, the vessel was constructed of clear acrylic plastic to facilitate viewing of the filter behavior. Strainers of a hub and radial design (not shown) were located on the bottom of the vessel to support the filter media and allow for removal of the filtrate and admittance of filtrate for upward flow during back-slip and backwash.

A synthetic feed with a turbidity of approximately 80 NTU was prepared by slurrying 50 mg/L of ISO fine test dust in city water. It was fed to the top of the filter with a centrifugal pump to a maximum pressure of 59 psi (407 kPa). There was no control on the feed pump and the flow velocity varied from 9–16 gallons per minute per square foot of filter area (gpm/ft$^2$) (22–39 m/h) depending on the change in flow resistance of the filter bed. Temperature of the feed-water was 15° C. The turbidity of the filtrate leaving the bottom of the filter was continuously monitored and recorded along with the inlet pressure and flow. Back-slips were conducted using tap water at a flow velocity of 12 gpm/ft$^2$ (29 m/h) and a temperature of 18° C.

The initial pressure at the inlet of the filter was 45 psi (310 kPa). As solids accumulated in the filter, the inlet pressure increased. A back-slip was initiated when the inlet pressure rose to approximately 59 psi (407 kPa). The back-slip was operated by passing filtered water up through the filter at a velocity of 12 gpm/ft$^2$ (29.3 m/h) for 20 seconds. The period between back-slips is defined as one segment. When the duration of a segment was deemed to be too short for practical operation, or after a pre-determined number of back-slips, a backwash was initiated. The period between backwashes is defined as one cycle.

Figure 1:
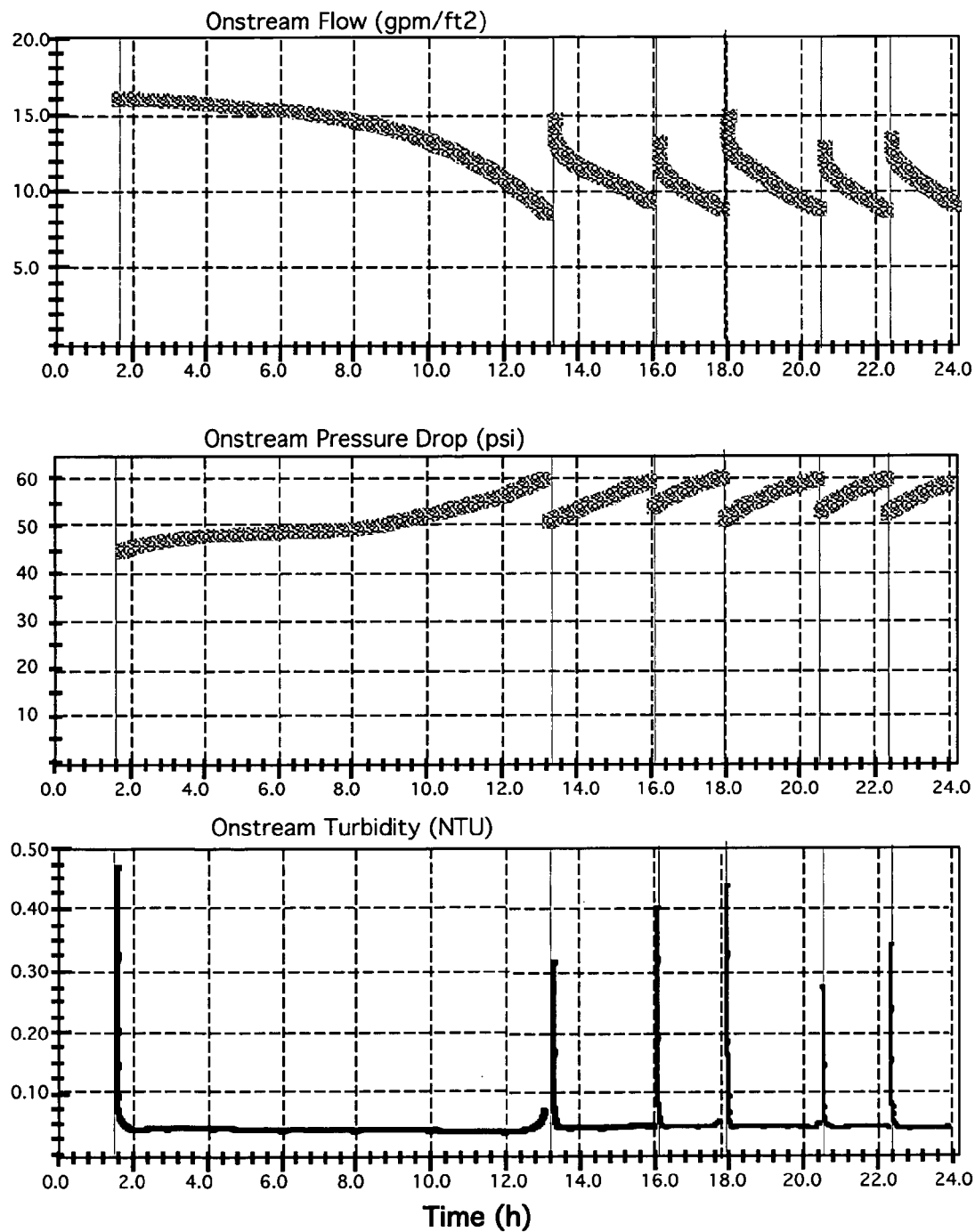
FIG. 1 comprises three graphs showing results from a typical filter run of a filter in accordance with example 1 below.

FIG. 1 shows the results from a typical filter run. The filter had been cleaned by backwashing prior to this run. This graph shows the service flow rate (i.e. velocity), inlet pressure and filtrate turbidity versus time for the first 24 hours of one complete cycle. Note that operation actually started at 1:40 h. From this graph it can be seen that the inlet pressure started at approximately 45 psi and increased to approximately 59 psi (407 kPa). During this period the flow started at approximately 16 gpm/ft$^2$ (39.1 m/h) and decreased to approximately 9 gpm/ft$^2$ (22 m/h) The initial turbidity of the filtrate dropped very quickly down to approximately 0.05 NTU and remained at approximately this level. After approximately 11.5 hours (i.e. at 13.3 h), the pressure reached 59 psi (407 kPa). At this time the service cycle was interrupted and a 20 second back-slip was performed.

After the back-slip, the filter was immediately returned to service. Note that after the back-slip, the inlet pressure dropped to 50 psi (345 kPa) and the flow increased to 14 gpm/ft$^2$ (34.2 m/h). There was a brief increase in the turbidity of the filtrate, but it returned to 0.05 NTU once again in less than two minutes. The filter remained in service for approximately 2.7 hours before the pressure increased to 59 psi (407 kPa) once again and another back-slip was performed. During this period, the turbidity remained at approximately 0.05 NTU.

In total, 10 back-slips were performed, each back-slip terminating one service segment. After the eleventh segment, a full back-wash was performed. The total duration of the service cycle was 30 hours during which period a total of 29,064 gallons (110 m$^3$) of feed water were processed. If no back-slips had been performed only 13,860 gallons (52.46 m$^3$) of feed water could have been treated if the same 59 psi (407 kPa) pressure end point were used. Thus the capacity of the filter was more than doubled through use of the back-slip process of the present invention.

It should finally be noted that the preceding description relates to a particular preferred embodiment of the invention only, and that modifications are possible within the broad scope of the invention. For example, the description refers to the use of filtrate as the liquid for performing the back-slip step. It should be noted that an external liquid could be used instead.

What is claimed is:

1. A method of operating a depth granular media filter comprising a filter vessel containing a bed of filter media, the method comprising the steps of:
   (a) passing a feed liquid downwardly through the bed during normal down-flow service of the filter for removing contaminants from the liquid by loading the contaminants onto the filter media;
   (b) periodically backwashing the media to remove contaminants from the filter media and displace the removed contaminants from the vessel; and,
   (c) at intervals between steps (a) and (b) passing upwardly through the bed a volume of liquid under flow conditions selected to displace at least some of the contaminants upwardly in the bed while essentially removing none of the contaminants from the vessel;
   wherein said filter bed comprises at least two media types of different but uniform particle sizes and densities, each media type forming a distinct layer in the vessel, the effective particle size of the media in each successive layer decreasing in a downward direction in the vessel;
   and wherein said volume of liquid is passed upwardly through the media bed in step (c) under flow conditions selected so that a lowermost one of said media layers expands by an amount greater than 25% of its unexpanded length while an uppermost media layer does not expand in length appreciably during the period in which liquid is passed upwardly through the media bed.

2. A method as claimed in claim 1 wherein the volume of liquid passed upward through the media bed in step (c) is less than one filter void volume.

3. A method as claimed in claim 1, wherein the volume of liquid passed upward through the media bed in step (c) is greater than the void volume of the finest media layer.

4. A method as claimed in claim 3 wherein the volume of liquid is passed upwardly through the media bed in step (c) under flow conditions selected so that contaminants loaded onto the filter media do not pass through the top surface of the uppermost media layer to a significant extent during the period in which liquid is passed upwardly.

5. A method as claimed in claim 1 wherein the duration of the period in which liquid is passed upward through the media bed in step (c) is chosen so that the uppermost media layer does not expand appreciably, but one or more of the lower media layers expands by an amount greater than 25% of its unexpanded height.

6. A method as claimed in claim 5, wherein the duration of the period in which liquid is passed upward through the media bed in step (c) is less than 60 seconds.

* * * * *